UNITED STATES PATENT OFFICE.

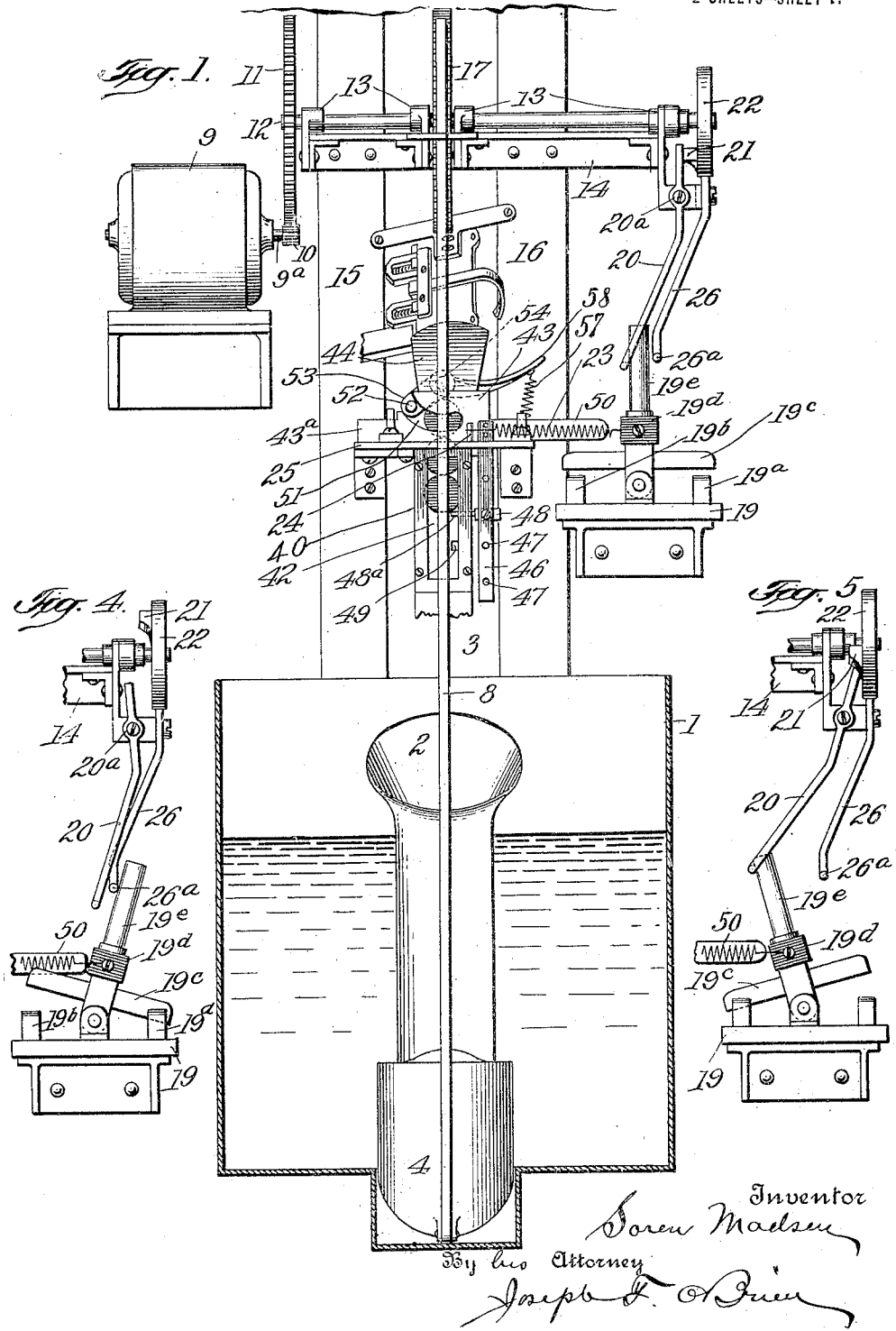

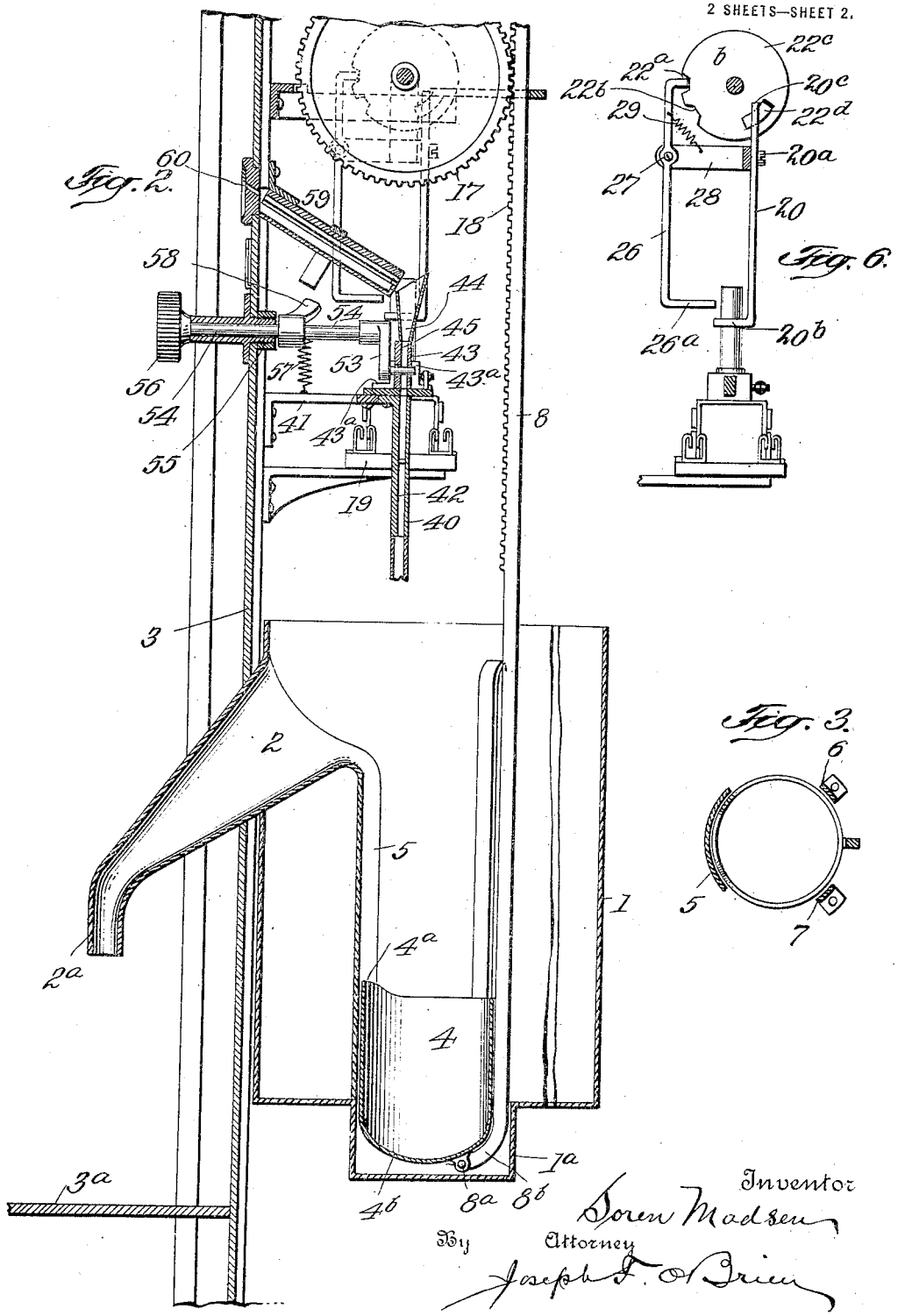

SOREN MADSEN, OF NEW YORK, N. Y.

LIQUID-VENDING APPARATUS AND COIN-ACTUATED MECHANISM.

1,375,639.  Specification of Letters Patent.  Patented Apr. 19, 1921.

Application filed December 4, 1916. Serial No. 134,804.

*To all whom it may concern:*

Be it known that I, SOREN MADSEN, a subject of the King of Denmark, and a resident of the borough of Manhattan, city, county, and State of New York, have invented certain new and useful Improvements in Liquid-Vending Apparatus and Coin-Actuated Mechanism, of which the following is a specification.

This invention relates to improvements in liquid vending apparatus and coin controlled actuating mechanism.

By the use of my invention I am enabled, without the use of pressure or similar devices, to deliver to a purchaser the exact supply of hot or cold liquid, such as coffee or milk, which is desired without any drippings, and without any variations. Furthermore, I am enabled to accomplish this result with an extremely simple mechanism which is unlikely to get out of order.

Other objects of my invention will be hereinafter fully explained in the specification and pointed out in the claims.

In the accompanying drawings in which similar reference characters designate corresponding parts throughout the several views, Figure 1 is a rear view partly in section of my preferred form of mechanism;

Fig. 2 is a central vertical section taken at right angles to the section shown in Fig. 1.

Fig. 3 is a section on the line 3—3 of Fig. 2;

Figs. 4, 5 and 6 are detail views of the cam and switch mechanism employed by me.

Referring now to these drawings, 1 indicates a container, tank or reservoir which, as shown, is formed of a square box having a depressed measure seat $1^a$ at its bottom portion. Said container 1 is provided contiguous to its top with a spout 2 extending from the container through a suitable opening in the wall 3 of the machine, the nozzle $2^a$ being disposed over a shelf $3^a$ fixed on the outside wall of the machine, on which shelf may be placed any suitable receptacle for the liquid which it is desired to purchase.

Suitably guided and propelled to move vertically within the tank 1 in alinement with the nozzle 2, is a tiltable measure 4 which, as shown, is in the form of a cylindrical cup having a lip or spout $4^a$ at one side thereof. As shown the cup 4 is guided by means of an arc-shaped guide piece 5 having an arc similar to the circumference of the cup and extending from the inner end of the spout 2 downwardly to the depressed cup seat $1^a$.

I also preferably provide additional guiding rods 6 and 7 at the opposite side of the cup to prevent lateral movement of the cup in its vertical travel. Suitable means for causing the measuring cup 4 to move vertically and for causing the said cup to be tilted when in its upward travel it reaches the inner end of the spout 2 is provided and, as shown, the lower end of the cup is round in shape as shown at $4^b$ and an actuating bar 8 is pivoted at its lower end as shown at $8^a$ to said round bottom $4^b$ of the cup 4, said bar being provided with a rounded portion $8^b$ conforming in curvature to the bottom of the measuring cup 4. Obviously when the rod 8 is moved upwardly it will move the cup 4 upwardly in its guides until the nozzle 2 is reached, whereupon because of the fact that the bar 8 is connected to the rounded bottom eccentrically, the cup 4 will, when it reaches said nozzle 2, automatically tip and dump its contents therethrough. Suitable means for moving the actuating bar 8 upwardly is provided and for this purpose I preferably employ electrically-operated means.

As illustrated, said means comprise a motor 9 rotated from any suitable source not shown. The motor 9 has its shaft $9^a$ provided with a small gear 10 which meshes with a large gear 11 on a shaft 12 mounted in suitable bearings 13 fixed on a bracket or shelf 14 and connected to inner beams 15—16 of the machine. Fixed on said shaft 12 is a gear 17 which engages with a toothed rack 18 on the operating bar 8. When the gear 17 is rotated in one direction it will of course cause the actuating bar 8 to be lifted upwardly and when rotated in the opposite direction the bar will be caused to move downwardly and into the liquid in the container or tank. In order to cause the motor to be rotated in one direction to lift the bar 8 and to be rotated in the reverse direction to move the bar and the cup secured thereto downwardly to the bottom of the container and there to stop, I provide a two-way switch 19 suitably connected up with the motor 9 and having what I shall term a "lifting contact $19^a$" and a reversing contact $19^b$ which are alternately engaged by a double-armed and pivoted circuit closer 19°, which may be retained in a neutral position to shut off the power.

The circuit closer 19° is normally retained in its neutral position, as shown in Fig. 1, by means of a lever 20 pivoted at 20ª and cooperating with a projection 21 on the side face of a cam wheel 22 which is fixed on the shaft 12. Said lever and projection retain said circuit-closer in such neutral position against the action of the spring 23 which is connected at one end to a ferrule 19ᵈ on the handle 19ᵉ of the circuit-closer and at the other end is connected to a stationary pin 24 on a bracket or shelf 25. Suitable coin controlled means are provided for moving the circuit-closer into starting position or into contact with the contacts 19ª, as illustrated in Fig. 4, in which position it is retained during the upward travel of the cup and then reversed by means of a lever 26 which is pivoted at 27 to a bracket 28 and is normally held in contact with the periphery of the cam wheel 22 by means of the spring 29 which is strung between said lever and the bracket 28. When the switch is forced over by the coin controlled mechanism hereinafter described into the position indicated in Fig. 4, the motor will rotate the shaft 12 having the gear wheel 17, and the cam 22 fixed thereon, whereupon the measuring cup will be lifted a suitable distance by the rack and simultaneously the lever 26 will be forced out of the notch 22ª in the cam wheel 22 and on to the periphery thereof, whereupon the elbow 26ª of the lever 26 will be shifted behind the upwardly projecting handle 19ᵉ of the circuit-closer so as to retain the circuit-closer in contact with the contacts 19ª and in the position indicated in Fig. 4 until the cam revolves a sufficient distance to cause the nose of the spring pressed lever 26 to enter the slot 22ᵇ, whereupon the elbow 26 will be withdrawn from retaining contact with the handle 19ᵉ and spring 23, which had previously been placed under tension by the coin controlled push bar, will pull the circuit-closer in the opposite direction and into contact with the contacts 19ᵇ as indicated in Fig. 5. The motor will thereupon be reversed and the nose of the spring pressed lever 26 will be forced out of the notch 22ᵇ and will ride back again on the periphery of the cam 22 to its initial starting position.

During the movement of the handle 19ᵉ into the position shown in Fig. 5 it engages and moves the elbow 20ᵇ of the lever 20 which is pivoted at 20ª and will cause the opposite end 20° of said lever to contact with the side face 22° of the cam wheel 22. When the shaft 12, which will then be moving in its reverse direction, reaches a position in which the cup 4 is in its proper lowermost position, the end 20° of the lever 20 will ride on the inclined projection 22ᵈ thus forcing the opposite end of the lever 20 and with it the handle 19ᵉ into the neutral position illustrated in Fig. 1 against the action of the spring 23.

My preferred means for actuating the push bar to move the switch into starting position comprises a tubular vertically disposed coin guide 40 mounted upon suitable brackets 41 and having a groove or slot 42. Mounted at the upper end of said coin guide, I provide a slide 43 mounted in ways 43ª and adapted to move transversely across said slot 40 of the coin guide. Said slide preferably carries at its upper end a coin chute 44 and is provided with a coin slot 45 which normally registers with the slot 42 of the coin guide, and a depending adjustment bar 46 (see Fig. 1) provided with screw apertures 47, to any one of which apertures is adapted to be secured an adjustable stop 48 which has a projection 48ª which will, when the slide is in its normal coin receiving position, extend through notches 49 into the slot 42 to obstruct the passage of a coin therethrough at any suitable point. Said stop may, of course, be positioned to obstruct the slot when it has one or a plurality of coins mounted edgewise upon each other therein.

Said slide also carries a switch actuating arm 50 and preferably is provided with an arc-shaped slot 51 intersecting the coin slot 45 of the coin chute in which slot 45 is adapted to move a projection 52 carried by an arm 53 which is oscillated by a shaft 54 mounted in bearings 55 and extending through the front wall of the machine where it is provided with an operating handle 56. When one or any other number of coins determined by the position of the stop 48 are inserted in the chute 44 of the slide, such coins will be disposed edgewise, and one of such coins will be disposed adjacent to or in alinement with the arc-shaped intersecting slot 51 and when the handle 56 is turned by the operator the projection 52 enters the slot and engages one edge of the coin and forces the keying coin and with it the slide to be moved laterally or transversely of the guide slot 42. The shaft 54 and arm 53 are, after actuation by the user, returned to original position by a spring 57 stretched between an arm 58 and the bracket 41. When such movement occurs the arm 50 will engage the switch handle 19ᵉ to throw the circuit closer 19° and start the motor, whereupon the liquid dispensing apparatus is actuated as hereinabove described and simultaneously therewith the depending bar 46 carrying the adjustable stop 48 will be withdrawn and the coin or coins retained in the guide slot will be released. When the switch handle 19ᵉ is moved rearwardly by the spring 23 into position indicated in Fig. 5, it contacts with and moves the arm 50 and slide 43 back into starting position.

A suitable fraud-detecting device 59 is preferably interposed between a coin slot 60 in the outside wall of the machine and the coin chute 44. Of course, if no coin is seated in the chute 44 the handle 56 may be operated freely, the projection 52 simply moving through the slot 51, without actuating the motor.

Having described my invention, I claim:

1. Vending apparatus embodying delivery mechanism, a coin-guide having a coin slot, a coin-carrying slide having a coin-receiving slot normally registering with the slot in the coin-guide, said slide being movable laterally of said coin-guide to carry the coin edgewise out of and back into registry therewith, a coin stop carried by said slide and movable into and out of registry with the slot in the coin guide, and an arm carried by said slide to actuate the said delivery mechanism.

2. Vending apparatus embodying delivery mechanism, a coin guide having a slot, a coin carrying slide mounted above said coin-guide and having a slot normally registering with the slot in the coin-guide, said slide being movable into and out of registry with the slot in said guide, an adjustable coin stop carried by said slide and adapted to project into the slot in the coin guide and means also movable with said slide for actuating said delivery mechanism.

3. Vending apparatus embodying delivery mechanism, a coin-guide having a slot, a coin carrying slide mounted above said guide and having a slot normally registering with the slot in the coin-guide, said slide being movable into and out of registry with the slot in said guide, an adjustable coin stop carried by said slide and adapted to project into the slot in the coin guide, means movable with said slide for actuating said delivery mechanism and means for retaining said delivery mechanism in delivery position.

4. Vending apparatus embodying delivery mechanism, a coin-guide having a slot, a coin carrying slide mounted above said coin-guide and having a slot normally registering with the slot in the coin-guide, said slide being movable into and out of registry with the slot in said guide, an adjustable coin stop carried by said slide and adapted to project into the slot in the coin guide, means movable with said slide for actuating said delivery mechanism, means for restoring said delivery mechanism to starting position and means actuated by said restoring means for moving said slide and stop into starting position.

5. Vending apparatus embodying delivery mechanism, a coin-guide having a slot, a coin carrying slide mounted above said coin-guide and having a slot normally registering with the slot in the coin-guide, said slide being movable into and out of registry with the slot in said guide, a depending stopping bar carried by said slide, and a coin stop adjustably mounted on said bar.

In witness whereof, I have signed my name to the foregoing specification in the presence of two subscribing witnesses.

SOREN MADSEN.

Witnesses:
 MARGARET W. MCCARTHY,
 ANNA O'BRIEN.